(12) United States Patent
Waggoner et al.

(10) Patent No.: US 10,467,775 B1
(45) Date of Patent: Nov. 5, 2019

(54) IDENTIFYING PIXEL LOCATIONS USING A TRANSFORMATION FUNCTION

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 15/585,610

(22) Filed: May 3, 2017

(51) Int. Cl.
*H04N 19/00* (2014.01)
*G06T 9/20* (2006.01)
*G06T 3/00* (2006.01)
*G06T 19/00* (2011.01)

(52) U.S. Cl.
CPC .............. *G06T 9/20* (2013.01); *G06T 3/005* (2013.01); *G06T 3/0056* (2013.01); *G06T 3/0087* (2013.01); *G06T 19/006* (2013.01)

(58) Field of Classification Search
CPC ..... G06T 3/005; G06T 3/0087; G06T 3/0093; H04N 19/563
See application file for complete search history.

(56) References Cited

U.S. PATENT DOCUMENTS

| | | | |
|---|---|---|---|
| 8,160,391 B1* | 4/2012 | Zhu | G06T 5/005 345/629 |
| 9,721,393 B1* | 8/2017 | Dunn | G06T 19/006 |
| 2015/0264259 A1* | 9/2015 | Raghoebardajal | G06T 3/0062 348/36 |
| 2016/0112704 A1* | 4/2016 | Grange | H04N 19/00575 375/240.12 |
| 2017/0026659 A1* | 1/2017 | Lin | H04N 19/597 |
| 2017/0094262 A1* | 3/2017 | Peterson | H04N 21/854 |
| 2017/0214937 A1* | 7/2017 | Lin | H04N 19/56 |
| 2017/0244775 A1* | 8/2017 | Ha | G06T 19/006 |
| 2017/0270634 A1* | 9/2017 | Eggebrecht | H04N 13/189 |
| 2017/0323423 A1* | 11/2017 | Lin | H04N 13/139 |
| 2017/0332107 A1* | 11/2017 | Abbas | H04N 19/86 |
| 2017/0336705 A1* | 11/2017 | Zhou | G06T 3/0062 |
| 2017/0345136 A1* | 11/2017 | Van der Auwera | G06T 5/006 |
| 2017/0358126 A1* | 12/2017 | Lim | G06T 3/0062 |
| 2017/0374385 A1* | 12/2017 | Huang | H04N 19/167 |
| 2018/0027178 A1* | 1/2018 | Macmillan | H04N 5/23238 348/38 |
| 2018/0075576 A1* | 3/2018 | Liu | H04N 13/161 |
| 2018/0101931 A1* | 4/2018 | Abbas | H04N 5/2258 |
| 2018/0184121 A1* | 6/2018 | Kim | H04N 19/597 |
| 2019/0082184 A1* | 3/2019 | Hannuksela | H04N 13/161 |

\* cited by examiner

*Primary Examiner* — Phong X Nguyen
(74) *Attorney, Agent, or Firm* — Weaver Austin Villeneuve & Sampson LLP

(57) ABSTRACT

Techniques are described for identifying pixel locations using a transformation function. A transformation function is identified based on the projection space of a 2D representation, and pixel locations are generated using the transformation function.

16 Claims, 5 Drawing Sheets

IDENTIFYING PIXEL LOCATIONS USING A TRANSFORMATION FUNCTION

BACKGROUND

A variety of media content streaming techniques are employed to deliver media content to client devices. Virtual Reality (VR) content is intended to provide an immersive experience in which a user is apparently surrounded by and interacts with a virtual environment constructed from actual or computer-generated images. The original source images from which VR content is constructed correspond to different views from the user's apparent location at the center of the environment (e.g., front, back, left, right, etc.). In order to encode the source images, the images are combined to form a two-dimensional (2D) representation (e.g., an equirectangular projection of a polygonal projection) in which each of the combined images corresponds to a portion of a three-dimensional (3D) shape, for instance, a cylinder or a cube. Typically, the 2D representation includes non-display pixels that do not contain image content. When non-display pixels are included during the encoding process, playback of the VR content can include visual artifacts, which disrupt a user's viewing experience.

DETAILED DESCRIPTION

This disclosure describes techniques for identifying pixel locations for video encoding using a transformation function. Typically, an encoder requests pixels according to standard pixel locations on a 2D representation of VR content. This includes non-display pixels, which the encoder interprets as a sharp edge making encoder performance less efficient and accurate, and often resulting in visual artifacts during playback. Therefore, instead of providing the pixels to the encoder according to the standard pixel locations, new pixel locations are determined based on the arrangement of the pixels in the 3D projection space, and pixels are provided to the encoder according to the new pixel locations. Using these new pixel locations, VR content can be encoded without at least some of the visual artifacts that result from an encoder using non-display pixels in the encoding process. An example may be instructive.

Figure 1:
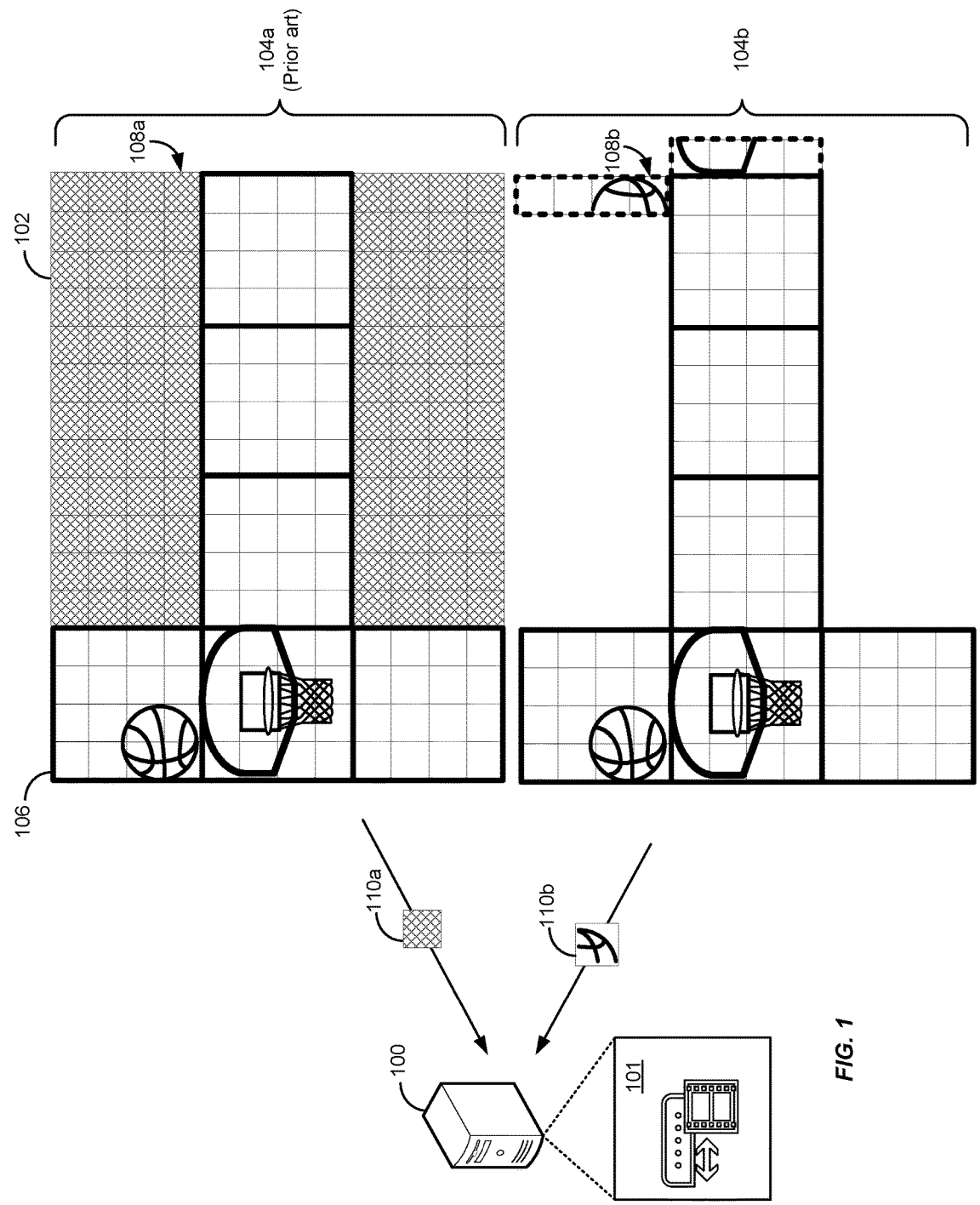
FIG. 1 illustrates an example of identifying pixel locations using a coordinate transformation function.

FIG. 1 illustrates an example of identifying pixel locations based on a 3D projection space. As shown in FIG. 1, computing device 100 includes encoder 101. Device 100 identifies pixels and provides them to encoder 101 for encoding source media content (e.g., VR content). In this example, six images (e.g., from a six-sided camera) have been stitched together into a 2D representation 102 of a polygonal projection space. In this example, 2D representation 102 corresponds to a cubic projection space. Representation 102 shows a basketball moving towards a basketball hoop with different regions including display pixels and non-display pixels. A non-display pixel is a pixel that does not contain source image content (represented as a null value or a set of pixels values set to 0), while a display pixel is a pixel that contains source image content (represented as a set of pixel values). Encoder 101 encodes 2D representation 102 according to the pixels it receives, and pixels can be provided to the encoder in a variety of ways. Conventionally, device 100 would provide pixels to encoder 101 sequentially according to the arrangement of pixel locations represented in 104a. By contrast, and according to various implementations enabled by the present disclosure, device 100 provides pixels to encoder 101 according to the arrangement of pixel locations represented in 104b.

In order for device 100 to provide pixels according to pixel locations 104b, first, device 100 identifies a polygonal projection space associated with representation 102 (e.g., polygonal projection space 106). In this example, polygonal projection space 106 is a cube. After identifying 3D polygonal projection space 106, device 100 identifies a coordinate transformation function based on polygonal projection space 106. In this example, the coordinate transformation function is a 3D coordinate transformation function for a cubic projection space. Next, device 100 generates new pixel locations according to the 3D coordinate transformation function (e.g., pixel locations 104b). In this way, when encoder 101 requests the next pixel, instead of device 100 providing pixel 110a to encoder 101 using pixel location 108a, device 100 provides pixel 110b using pixel location 108b to encoder 101. By providing pixel 110b instead of pixel 110a and any other adjacent display pixels not identifiable using standard pixel location, VR content is encoded without visual artifacts that would result from non-display pixels being included during encoding.

Figure 2:
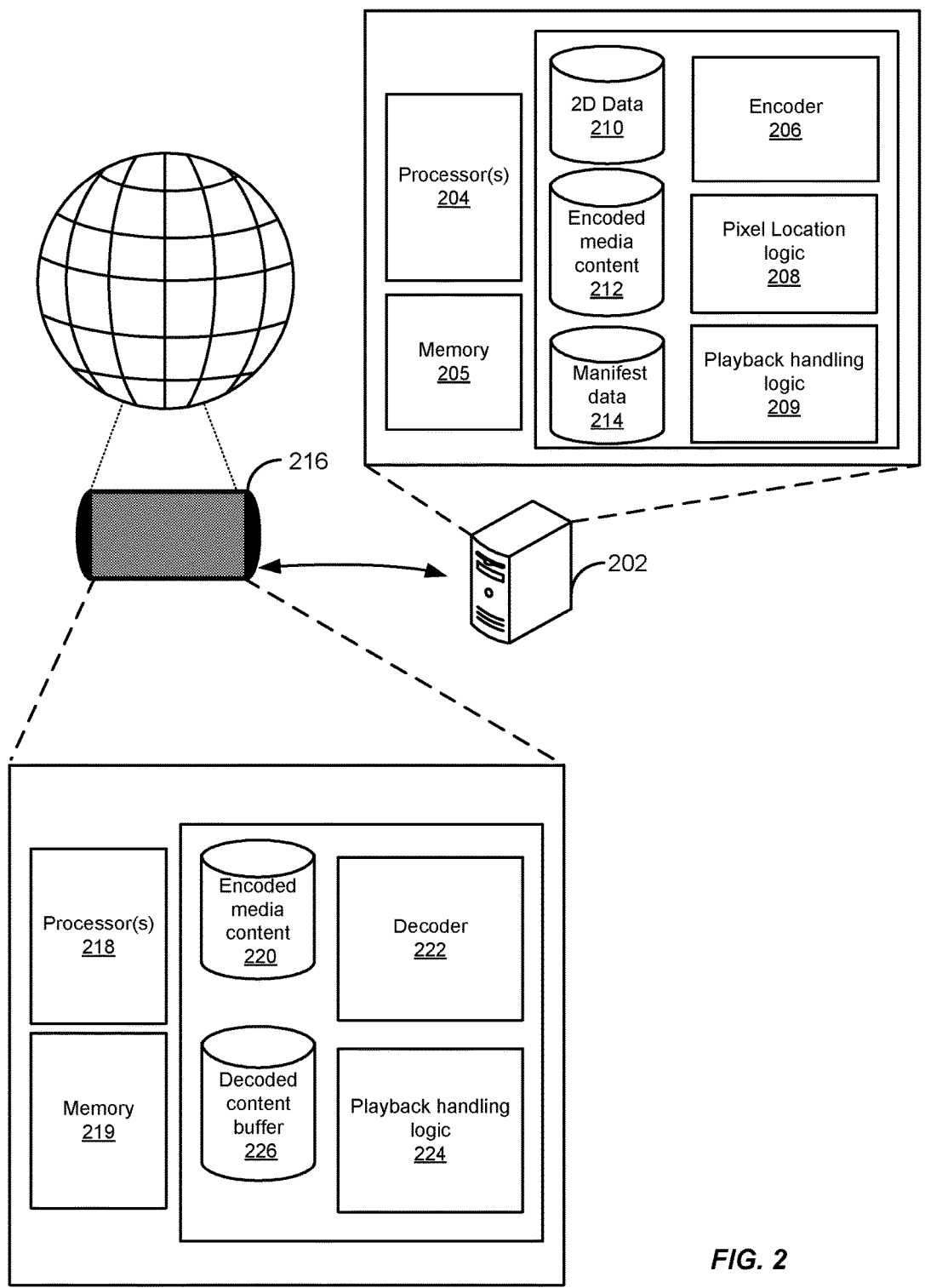
FIG. 2 illustrates an example of a computing environment for encoding media content.

FIG. 2 illustrates an example of a computing environment for encoding media content. The computing environment of FIG. 2 includes encoding server 202 that encodes media content for playback on viewer device 216. Viewer device 216 can receive encoded media content from an edge server or encoding server 202, or it might receive media content using a physical medium, e.g., memory 219. In FIG. 2, viewer device 216 is a wearable VR device. However, related functionality can be implemented in laptop computers, televisions, tablets, smartphones, wearable devices, virtual or augmented reality headsets, video game consoles, etc.

Encoding server 202 might conform to any of a wide variety of architectures, and its functionality may be implemented by a variety of physical servers and/or virtual servers. For example, one server might encode media content, and the encoded media content might be provided to another server, for example, belonging to a content delivery network (CDN). As such, the functionality and components of encoding server 202 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer device 216), integrated into a separate application from another entity, implemented in an edge server or content server of a CDN, a server of an ISP, etc. Media content is deliverable to viewer device 216 in a variety way. In one example, media content is streamed as fragments delivered separately from a media server, e.g., adaptive bitrate streaming. In another example, a single media content file is delivered and downloaded by viewer device 216 and used by viewer device 216 for playback.

In some implementations, encoding server 202 is partitioned to have separate virtual servers configured to perform different functions. In one example, one virtual server could generate manifests, and a second virtual server might provide manifests and encoded media to viewer device 216. In another example, several virtual servers are configured to encode VR content and deliver the encoded VR content to many viewer devices.

Encoding server 202 includes one or more processor circuits 204, memory 205, and other hardware components to encode media content and provide the encoded media content to viewer device 216. For example, processor circuits 204 execute stored instructions in memory 205 using encoder 206 to implement encoding techniques disclosed herein. Encoder 206 can be configured to encode bitstreams that are compliant with a variety video coding formats (e.g., H.265/High Efficiency Video Coding, H.264/MPEG-4 Advanced Video Coding, MPEG-2, etc. It should be noted that, while processor circuits 204, memory 205, 2D data 210, encoded media content 212, manifest data 214, and logics 208 and 209 are contemplated as integrated with encoding server 202, implementations are contemplated in which some or all of their respective functionality is implemented independently of a single server. It should also be noted that processor circuits 204, logic 208-209, or both processor circuits 204 and execute logic 208-209 can be implemented using special purpose circuitry, e.g., a field programmable gate array or an application specific integrated circuit.

In FIG. 2, encoding server 202 includes various types of logic to encode VR content and provide encoded VR content to viewer device 216. For example, encoding server 202 includes pixel location logic 208 for identifying pixel locations using a transformation function that may be based on non-Euclidean geometry or a variety of other 3D coordinate systems. In some implementations, pixel location logic 208 is implemented as part of encoder 206. Pixel location logic 208 includes a variety of techniques to convert coordinates from images stored in 2D data 210 to 3D coordinates corresponding to positions of the pixels as displayed during playback. As part of the encoding process, encoder 206 receives pixels identified by encoding server 202 using pixel location logic 208. Encoder 206 may receive pixels such that the next pixel received was not adjacent (on the 2D representation) to the previous pixel received. Encoding server 202 also includes playback handling logic 209 for handling requests for media content and providing the requested media content using media content from encoded media content 212 and manifest data 214. In some implementations, manifest generation logic identifies data from manifest data 214 after receiving a request for playback of media content and generates a manifest. After generating the manifest, the manifest is stored in memory such as a local buffer and/or cache, memory 205 to be used in conjunction with playback handling logic 209.

Viewer device 216 can also include various types of logic used to implement a decoder 222 to decode encoded media content 220 received from encoding server 202, store the decoded media content in decoded content buffer, and play back the decoded media content using playback handling logic 224. Viewer device 216 includes one or more processors 218, memory 218, and other hardware components or circuits to decode and play back the encoded media content. For example, processor(s) 218 of viewer device 216 can execute stored instructions in memory 219 to implement decoding techniques based on the decoding techniques to store decoded content for playback in decoded content buffer 226.

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
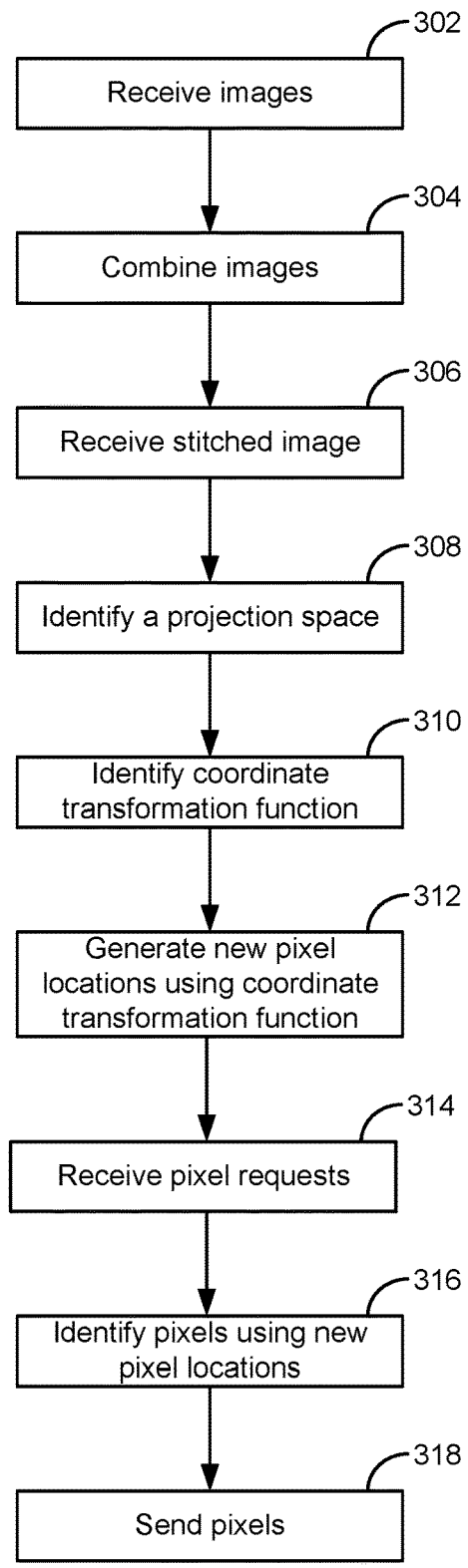
FIG. 3 is a flowchart illustrating identifying pixel locations using a transformation function.

A specific implementation will now be described with reference to the flow diagram of FIG. 3. One or more images representing a video frame of virtual content are received (302). As discussed above, the type and the number of images may vary. For example, the images may correspond to different views of a real-world environment generated by the image capture devices of a VR camera. Alternatively, the images may be different views of a virtual environment created using computer animation tools. In another example, the number of images may vary considerably depending on the projection space represented by the image data. A cylindrical projection space might have only one or two images, while a polygonal projection space might have as few as four and as many as 20 or more images.

The received images are combined (or stitched) to form a two-dimensional or "flattened" representation, which includes the various views corresponding to portions of the cylindrical projection space or faces of the polygonal projection space (304). As one example previously mentioned, FIG. 1 shows an example of six images stitched together to form 2D representation 102 corresponding to a cube which is displayed in a spherical projection space. This may be done in the VR camera, using a computer animation tool, or at a point prior to when an encoder begins encoding the 2D representation. The 2D representation is then provided to a server (e.g., encoding server 202 of FIG. 2) for encoding (306).

After receiving the 2D representation, a projection space associated with the 2D representation is identified (308). In one example, the projection space that is identified is an equirectangular projection space (e.g., a cylindrical projection space from multiple images stitched together using multiple images from horizontally spaced cameras). In another example, the projection space is a polygonal projection space. As such, the server identifies the type of polygon (or polyhedron) associated with the polygonal projection space. Types of polygonal projection spaces include a tetrahedron (having 4 faces), a cube (having 6 faces), an octahedron (having 8 faces), a dodecahedron (having 12 faces), or an icosahedron (having 20 faces). In some implementations, after the projection space is identified for an initial 2D representation received by a server, the server no longer identifies the type the polygon for each of the remaining 2D representations later received. After identifying a projection space, a transformation matrix associated with the projection space is identified and used to generate pixel locations for each 2D representation subsequently received. For example, if the projection space identified is an icosahedron, a transformation matrix for a 2D representations that include an icosahedron projection space is identified. The transformation matrix may remap each of the coordinates on the 2D representation to quickly identify new pixel locations as discussed further below.

In some implementations, projection spaces are identified using metadata included with a 2D representation. For example, 2D representation 102 of FIG. 1 may include one or more metadata fields describing various attributes of 2D representation 102, with one of those fields being a field indicating a type of projection space. Using the example of FIG. 1, the value for a type field is a cube, but the value could be any of the polygon shapes discussed above, as well as equirectangular.

In other implementations, if metadata is not included in a 2D representation, projection spaces are identified using characteristics of the 2D representation. Characteristics of the 2D representation include a number of faces, shape of the faces, straight or diagonal edges, or locations of vertices. Using the example of FIG. 1, device 100 identifies the projection space associated with 2D representation 102 by identifying the number of faces for projection space 106 (e.g., 6 faces) and the shape of the 6 faces (e.g., square).

Each type of projection space has at least one coordinate transformation function for generating new pixel locations. After (or as part of) the identification of the projection space, the server identifies a coordinate transformation function associated with the identified projection space (310) and uses the coordinate transformation function to generate new pixel locations (312).

Figure 4A:
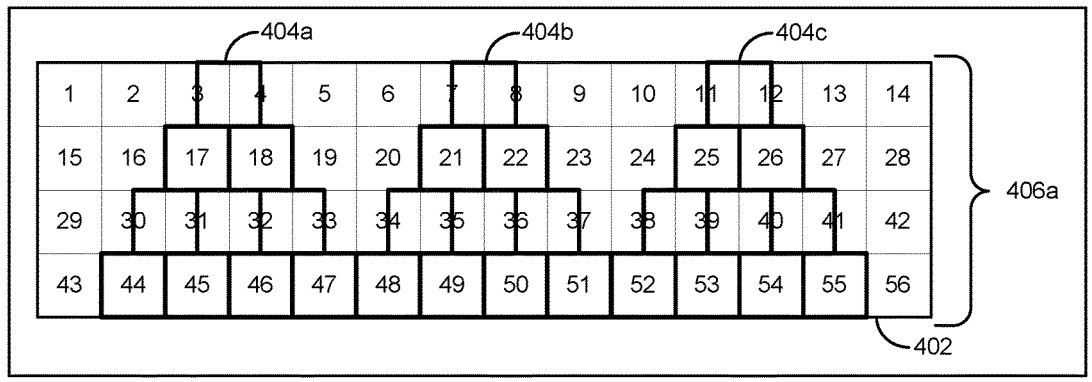
FIG. 4A illustrates an example of a 2D representation of virtual reality content.

FIG. 4A shows a simplified example of pixel locations of VR content prior to encoding. In FIG. 4A, 2D representation 402 includes faces 404a, 404b, and 404c (3 faces of an icosahedron). Each of faces 404a, 404b, and 404c include display pixels at corresponding pixel locations (e.g., 17, 18, 21, 22, etc.). Pixel locations not within faces 404a, 404b, or 404c identify non-display pixels at corresponding pixel locations (e.g., 19, 20, 23, 24, etc.). In some implementations, pixel locations 406a are standard or default pixel locations of a 2D representation of VR content.

Figure 4B:
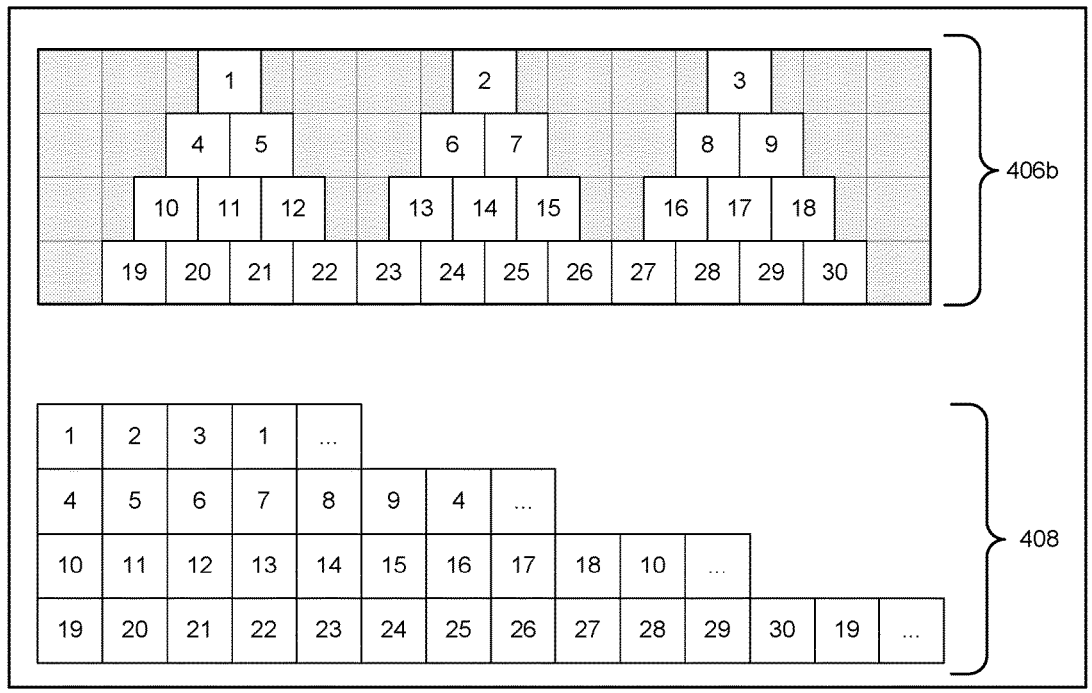
FIG. 4B illustrates an example of generating pixel locations.

In some implementations, new pixel locations are generated for each pixel location of faces 404a, 404b, and 404c. For example, FIG. 4B shows pixels corresponding to new pixel locations generated using a coordinate transformation function. In FIG. 4B, pixel locations 406b only correspond to display pixels, and there are no pixel locations that identify non-display pixels. For example, the top display pixels seen in faces 404a, 404b, and 404c of FIG. 4A are the same display pixels at locations 1, 2, and 3 of FIG. 4B. In some implementations, instead of remapping each individual pixel to a new pixel location, average pixel values of the pixels at pixel locations 406a of FIG. 4A are used to generate the pixel values of the pixels at pixel locations 406b. For example, the pixel at location 11 of FIG. 4B is an average of the pixels at locations 31 and 32 of FIG. 4A. In this example, the pixel value of the pixel at location 11 of FIG. 4B is 50% of the pixel at location 31 and 50% of the pixel at location 32 of FIG. 4A. Other averages can also be used, for instance, an average pixel value might be 25% of four surrounding pixel values. Various filters may be used to find average pixel values, for example, linear filtering, bilinear filtering, antialiasing filtering, bi-cubic filtering, etc. In order to avoid aliasing artifacts, sampling rates using one of these filtering techniques are constrained to a threshold that is based on the Nyquist limit for the 2D representation, i.e., twice the highest frequency sampling to be preserved in the filtered VR content. Those of skill in the art will appreciate that the foregoing are merely some examples of filtering techniques that may be employed to filter pixel values as described herein.

As mentioned above, each type of projection space has at least one coordinate transformation function. For example, if the type of polygonal projection space is a cube, coordinates for the coordinate transformation function define the vertices of each face of the cube. The vertices of a front face of the cube are (0, 0, 0; 1, 0, 0; 1, 0, 1; and 0, 0, 1). The coordinates at the vertices of a right face of the cube are (1, 0, 0; 1, 1, 0; 1, 1, 1; and 1, 0, 1). The coordinates at the vertices of a back face of the cube are (1, 1, 0; 0, 1, 0; 0, 1, 1; and 1, 1, 1). The coordinates at the vertices of a left face of the cube are (0, 1, 0; 0, 0, 0; 0, 0, 1; and 0, 1, 1). The coordinates at the vertices of a top face of the cube are (0, 0, 1; 1, 0, 1; 1, 1, 1; and 0, 1, 1). The coordinates at the vertices of a bottom face of the cube are (0, 0, 0; 1, 0, 0; 1, 1, 0; and 0, 1, 0). In another example, if the type of polygonal projection space is an icosahedron the following 12 vertices can be combined to make up each face of the icosahedron: (0, ±1, ±φ) (±1, ±φ, 0) (±, 0, ±1), with φ representing $$\frac{1+\sqrt{5}}{2}.$$

Similar coordinate transformation functions can be used for tetrahedrons, octahedron, dodecahedrons, or other projection spaces.

Depending on how edges are joined, there are many different ways that the faces of a polyhedron can be connected. As such, the coordinate transformation function can further define the coordinates of each vertex and the order in which the faces are connected. Faces sharing vertices are adjacent during playback of VR content on a playback projection space. For example, the front face of a cube shares the vertices of (1, 0, 0) and (1, 0, 1) with the right face of a cube. In another example using an icosahedron, one face of the icosahedron shares the vertices of (−φ, −1, 0) and (0, −φ, −1). The order that faces are connected can be used to determine which faces include adjacent pixels for the purposes of motion estimation prediction between encoded frames discussed below.

In some implementations, adjacent faces are used to determine the size and boundaries of blocks of pixels to be used for encoding (e.g., coding units, slices, tiles, blocks, macroblocks. Blocks of pixels are configured to align along adjacent faces in the output such that block size tends to decrease in size (e.g., 8×8 pixels, 4×4 pixels, or 2×2 pixels) at pixel locations near the edge of a face. For example, adjacent faces are typically encoded without reference to other faces to be displayed within the same projection space (e.g., non-display pixels are included as part of the encoding process), and as such, the VR content at the edge of a face might be encoded with a perceptible drop in quality, which disrupts a viewer's experience during the playback of the VR content. By configuring block sizes to align with edges of a face, each face can be encoded with reference to the other adjacent faces, avoiding abrupt changes in quality.

Figure 5:
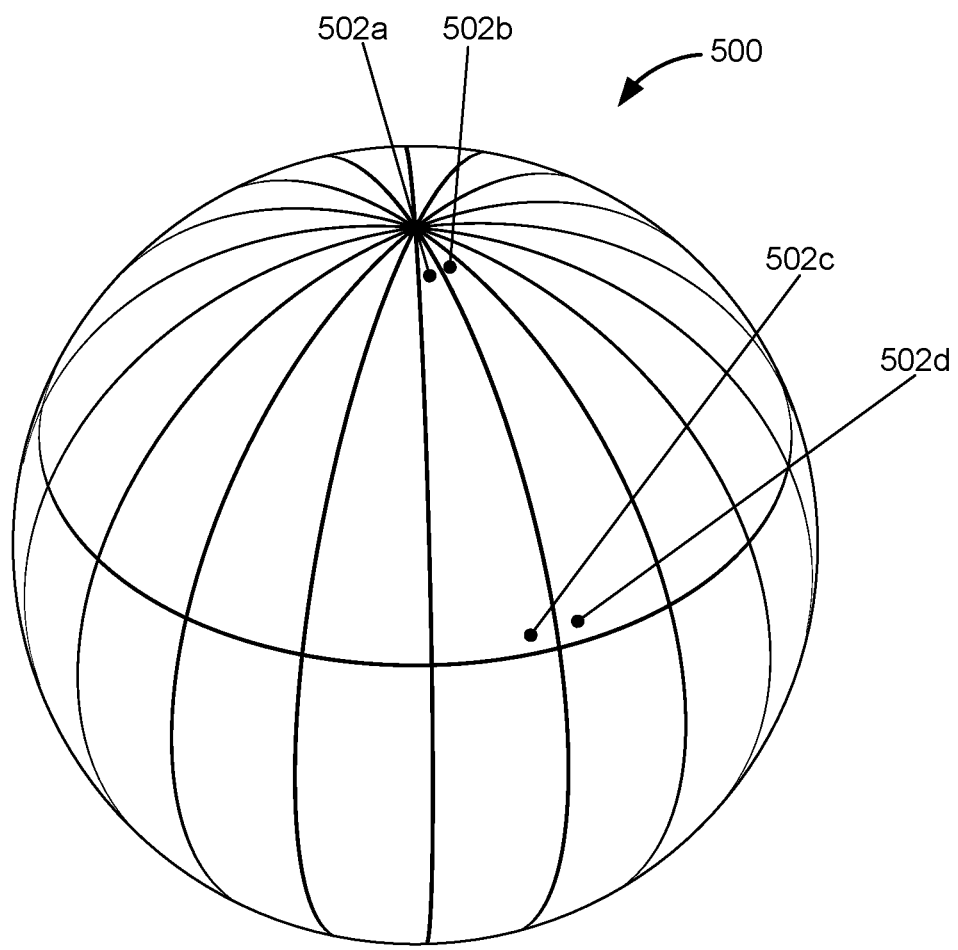
FIG. 5 illustrates another example of generating pixel locations.

In some implementations, spherical coordinates are used as part of a coordinate transformation function to generate new pixel locations for equirectangular projections or polygonal projections. In order to generate new pixel locations using spherical coordinates, the vertices of each face of a polyhedron are identified using a coordinate transformation function (e.g., longitude and latitude). In an example using an icosahedron, the latitudes of each vertex, begin at either of the two vertices at the poles of an icosahedron are at latitudes of +90° and −90°, with the remaining ten vertices evenly spaced at incrementing latitudes of 26.57° (arctan (½)). The longitudes of the ten vertices not at the poles are also evenly spaced at longitudes 36° apart. Using the vertices as points of reference, the remaining pixel locations are generated. For example, using a first vertex, a vertical position is identified (e.g., 72° longitude). Next, curvature of a playback projection is identified at the vertical position. This can give the approximate distance from one point to the next on the playback projection space. From that, horizontal positions of the pixels to the right and left of the first vertex can be identified. For example, in FIG. 5 pixel locations 502a, 502b, 502c, and 502d are shown as part of projection 500. As shown in FIG. 5, a non-Euclidean coordinate transformation function can be used because there are no straight lines between points on projection 500, but rather only curved lines, or the shortest path between two points. For the purposes of identifying the shortest path between two pixels, the curvature of playback projection is included to accurately identify adjacent pixel locations. Depending on the curvature of projection 500, the distance between pixels may increase or decrease. For example, pixel location 502a and 502b, which are near a pole of projection 500 are relatively close to each other compared to pixel locations 502c and 502b, which are towards the equator of projection 500.

Returning to FIG. 3, an encoder sends requests for pixels to use as part of encoding a 2D representation (314), and pixels are identified and sent using the new pixel locations discussed above (316)(318). The number of pixels requested can vary depending on how the 2D representation is to be encoded. For example, blocks of pixels ranging from 16×16 pixels, 8×8 pixels, 4×4 pixels, or 2×2 pixels may be used. For example, in FIG. 4B, using pixel locations 406b the encoder receives pixels in the order shown as part of encoder memory 408. In this example, an encoder requests pixels moving from left to right and top to bottom. The pixels at pixel locations 1, 2, and 3 represent pixels at a pole of a playback projection space. If the encoder requests the top row of pixels, pixels 1, 2, 3, and an additional reference to pixel 1 are sent to the encoder (compare this to using pixel locations 406a of FIG. 4A, where pixels at pixel locations 1-14 would be sent). In this example, the encoder is requesting pixels as part of estimating motion by identifying the difference in pixel values among adjacent pixels. As such, in order for the encoder to find the difference between all the pixels on the top row, the additional reference to pixel 1 is used by the encoder to compare values between pixel 3 and pixel 1. Similarly, an additional reference to pixel 4 is included for the second row, an additional reference to pixel 10 for the third row, an additional reference to pixel 19 for the fourth row, etc. In addition, similar requests are made for motion estimation along columns of pixels (e.g. an additional copy of pixel 1 would be used by the encoder to compare the value pixel 19 to the pixel below, which is pixel 1). It will be understood by those skilled in the art that a variety of motion estimation techniques as defined according to various encoding standards (mentioned above) can also be used with the disclosed implementations.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving a two-dimensional (2D) rectangular representation of virtual reality (VR) content, the 2D rectangular representation corresponding to a three-dimensional (3D) projection space and having first pixel locations;
   identifying a coordinate transformation function between the 2D rectangular representation and the 3D projection space;
   generating second pixel locations from the first pixel locations using the identified coordinate transformation function, the first pixel locations including a first subset corresponding to nondisplay pixels that do not contain image content in the 2D rectangular representation, and the second pixel locations including a second subset corresponding to display pixels in the 3D projection space, wherein the first pixel locations represent 2D coordinates, and wherein the second pixel location represents 3D coordinates;
   receiving pixel requests from an encoder, the pixel requests indicating at least one pixel location in the first subset for the 2D representation;
   identifying pixels according to the second pixel locations; and
   providing, in response to the pixel requests, the identified pixels including at least one pixel value for a pixel location in the second subset instead of a pixel value for a pixel location in the first subset to the encoder.

2. The method of claim 1, wherein the 3D projection space is one of a cylinder, a tetrahedron, a cube, an octahedron, a dodecahedron, or an icosahedron.

3. A computer-implemented method, comprising:
   receiving a two-dimensional (2D) representation of virtual reality (VR) content, the 2D representation corresponding to a three-dimensional (3D) projection space and having first pixel locations;
   identifying a coordinate transformation function between the 2D representation and the 3D projection space;
   receiving, from an encoder, a first request indicating a first one of the first pixel locations in the 2D representation;
   generating a second pixel location from the first one of the first pixel locations using the identified coordinate transformation function, the first one of the first pixel locations corresponding to a nondisplay pixel that does not contain image content in the 2D representation, and the second pixel location corresponding to a display pixel in the 3D projection space, wherein the first pixel locations represent 2D coordinates, and wherein the second pixel location represents 3D coordinates; and providing, in response to the first request, a pixel value for the second pixel location instead of a pixel value for the first one of the first pixel locations to the encoder.

4. The method of claim 3, wherein the projection space is a three-dimensional (3D) polygonal projection space, and wherein the transformation function is identified based on the 3D polygonal projection.

5. The method of claim 3, wherein generating the second pixel location includes:
identifying a vertical position of the first one of the first pixel locations;
determining a curvature of a playback projection at the vertical position of the first pixel location;
determining a horizontal position of the second pixel location according to the curvature; and
identifying the second pixel location using the vertical position and the horizontal position.

6. The method of claim 3, further comprising:
generating a plurality of second pixel locations from the first pixel locations using the transformation function;
identifying a first set of vertices from the plurality of second pixel locations;
determining that the first set of vertices are associated with a first face of the projection space;
identifying a second set of vertices from the plurality of second pixel locations;
determining that the second set of vertices are associated with a second face of the projection space;
determining that the first set of vertices and the second set of vertices include a shared vertex; and
determining that the first face and the second face are adjacent according to the shared vertex.

7. The method of claim 6, further comprising:
receiving a request from an encoder for a block of pixels;
identifying pixels according to pixel locations corresponding to the first face; and
providing the identified pixels to the encoder.

8. The method of claim 3, wherein the projection space is one of an equirectangular projection, a tetrahedron projection, a cubic projection, an octahedron projection, a dodecahedron projection, or an icosahedron projection.

9. The method of claim 3, wherein a pixel at the second location includes an average pixel value based on two or more pixels corresponding to the first pixel locations.

10. A system, comprising one or more processors and memory configured to:
receive a two-dimensional (2D) representation of virtual reality (VR) content, the 2D representation corresponding to a three-dimensional (3D) projection space and having first pixel locations;
identify a coordinate transformation function between the 2D representation and the 3D projection space;
receive, from an encoder, a first request indicating a first one of the first pixel locations in the 2D representation;
generate a second pixel location from the first one of the first pixel locations using the identified coordinate transformation function, the first one of the first pixel locations corresponding to a nondisplay pixel that does not contain image content in the 2D representation, and the second pixel location corresponding to a display pixel in the 3D projection space, wherein the first pixel locations represent 2D coordinates, and wherein the second pixel location represents 3D coordinates; and
provide, in response to the first request, a pixel value for the second pixel location instead of a pixel value for the first one of the first pixel locations to the encoder.

11. The system of claim 10, wherein the projection space is a three-dimensional (3D) polygonal projection space, and wherein the transformation function is identified based on the 3D polygonal projection.

12. The system of claim 10, wherein the one or more processors and memory are configured to generate the second pixel location by:
identifying a vertical position of the first one of the first pixel locations;
determining a curvature of a playback projection at the vertical position of the first pixel location;
determining a horizontal position of the second pixel location according to the curvature; and
identifying the second pixel location using the vertical position and the horizontal position.

13. The system of claim 10, wherein the one or more processors and memory are configured to:
generate a plurality of second pixel locations from the first pixel locations using the transformation function;
identify a first set of vertices from the plurality of second pixel locations;
determine that the first set of vertices are associated with a first face of the projection space;
identify a second set of vertices from the plurality of second pixel locations;
determine that the second set of vertices are associated with a second face of the projection space;
determine that the first set of vertices and the second set of vertices include a shared vertex; and
determine that the first face and the second face are adjacent according to the shared vertex.

14. The system of claim 13, wherein the one or more processors and memory are further configured to:
receive a request from an encoder for a block of pixels;
identify pixels according to pixel locations corresponding to the first face; and
provide the identified pixels to the encoder.

15. The system of claim 10, wherein the projection space is one of an equirectangular projection, a tetrahedron projection, a cubic projection, an octahedron projection, a dodecahedron projection, or an icosahedron projection.

16. The system of claim 10, wherein a pixel at the second location includes an average pixel value based on two or more pixels corresponding to the first pixel locations.

* * * * *